US009637058B1

(12) United States Patent
Garcia Zarco et al.

(10) Patent No.: US 9,637,058 B1
(45) Date of Patent: May 2, 2017

(54) MULTITASK TABLE FOR UPPER TRUNK BODY

(71) Applicant: FORD GLOBAL TECHNOLOGIES, LLC, Dearborn, MI (US)

(72) Inventors: Pedro Garcia Zarco, Mexico City (MX); Omar Yuren Mendoza Bravo, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/018,332

(22) Filed: Feb. 8, 2016

(51) Int. Cl.
B62D 25/10 (2006.01)
B60R 5/04 (2006.01)

(52) U.S. Cl.
CPC .................... B60R 5/042 (2013.01)

(58) Field of Classification Search
CPC .. B60R 5/045; B60R 5/04; B60R 9/00; B62D 65/00; B60P 7/0807; B60P 3/14; G07C 5/00; G06F 17/00; G06F 3/0484
USPC ............... 296/76, 146.8, 24.43, 37.16, 37.6; 108/44
IPC ...................................... B60P 7/0807
See application file for complete search history.

(56) References Cited

U.S. PATENT DOCUMENTS

| | | | | | |
|---|---|---|---|---|---|
| 2,483,478 A | * | 10/1949 | Smelker | .................. | E04H 15/06 135/143 |
| 2,554,776 A | * | 5/1951 | Comeau | .................. | B60R 5/041 224/42.34 |
| 2,577,263 A | * | 12/1951 | Myers | .................... | B62D 25/12 224/311 |
| 3,318,471 A | * | 5/1967 | Barr | .......................... | B60R 7/10 224/549 |
| 3,473,680 A | * | 10/1969 | Downer | .................. | B60R 11/06 224/311 |
| 3,534,892 A | * | 10/1970 | Truelove, Sr. | ............ | B60R 7/02 224/311 |
| 4,357,046 A | | 11/1982 | Lalanne | | |
| 4,455,948 A | * | 6/1984 | Torres | .................... | A47B 31/06 108/138 |

(Continued)

FOREIGN PATENT DOCUMENTS

CN 203391655 U 1/2014
DE 19714497 A1 10/1998

(Continued)

OTHER PUBLICATIONS

English machine translation of CN203391655U.

(Continued)

*Primary Examiner* — Kiran B Patel
(74) *Attorney, Agent, or Firm* — Vichit Chea; King & Schickli, PLLC

(57) ABSTRACT

An integrated work surface assembly for a motor vehicle cargo area includes a substantially planar workpiece configured for translation along a pair of cargo area closure panel support arms between a fully stowed configuration and a fully deployed configuration. A recess in the cargo area closure panel receives and holds the workpiece in the fully stowed configuration. Each support arm includes a guide slot for slidingly translating the substantially planar workpiece between the fully stowed configuration and the fully deployed configuration. Stops are provided for arresting downward translation of the workpiece in the fully deployed configuration.

20 Claims, 5 Drawing Sheets

(56) References Cited

U.S. PATENT DOCUMENTS

| | | | | |
|---|---|---|---|---|
| 4,832,242 | A * | 5/1989 | Leek | B60R 11/00 224/311 |
| 5,167,433 | A * | 12/1992 | Ryan | B60R 13/01 220/533 |
| 5,505,358 | A * | 4/1996 | Haase | B60R 7/02 224/277 |
| 5,829,813 | A * | 11/1998 | LaValle | B60R 7/02 224/311 |
| 5,865,497 | A * | 2/1999 | Klein | B60R 5/044 292/338 |
| 6,263,867 | B1 * | 7/2001 | Skelton | B60R 9/02 126/25 R |
| 6,572,168 | B1 * | 6/2003 | Radstake | B60R 7/14 224/311 |
| 6,830,281 | B2 * | 12/2004 | Hoffman | B60J 7/1621 296/100.1 |
| 7,628,440 | B2 * | 12/2009 | Bernhardsson | B60R 5/04 296/37.14 |
| 7,731,260 | B2 * | 6/2010 | Heller | B60P 7/14 296/24.4 |
| 8,172,296 | B2 * | 5/2012 | Umeda | B60R 5/045 296/24.43 |
| 8,235,269 | B2 * | 8/2012 | Rupar | B60R 5/04 224/539 |
| 8,444,198 | B2 * | 5/2013 | Pauken | B60R 7/02 224/309 |
| 8,534,736 | B1 * | 9/2013 | Whalen | B60R 5/045 296/37.14 |
| 8,905,276 | B2 * | 12/2014 | Bernert | B60R 5/04 224/281 |
| 9,016,750 | B2 * | 4/2015 | Izydorek | B60R 9/042 296/37.6 |
| 9,321,402 | B2 * | 4/2016 | Nedelman | B60R 7/02 |
| 9,387,812 | B2 * | 7/2016 | Bexar | B60R 9/06 |
| 9,527,451 | B2 * | 12/2016 | Krishnan | B60R 5/047 |
| 2008/0100087 | A1 * | 5/2008 | Terhaar | B60J 7/1621 296/100.06 |
| 2009/0167043 | A1 * | 7/2009 | Aebker | B60R 5/045 296/37.16 |
| 2010/0206666 | A1 * | 8/2010 | Jeeves | B60P 3/14 182/150 |
| 2010/0264689 | A1 * | 10/2010 | Lounds | B60J 5/103 296/146.8 |
| 2015/0343953 | A1 * | 12/2015 | Stanczak | B60R 5/045 296/24.44 |

FOREIGN PATENT DOCUMENTS

| | | |
|---|---|---|
| DE | 102005019636 A1 | 11/2006 |
| EP | 1728684 A1 | 12/2006 |
| JP | 8216791 A | 8/1996 |
| KR | 2007044629 A | 4/2007 |
| KR | 20120006664 U | 9/2012 |

OTHER PUBLICATIONS

English machine translation of DE102005019636A1.
English machine translation of DE19714497A1.
English machine translation of EP1728684A1.
English machine translation of JP8216791A.
English machine translation of KR2007044629A.
English machine translation of KR20120006664U.

* cited by examiner

MULTITASK TABLE FOR UPPER TRUNK BODY

TECHNICAL FIELD

This disclosure relates generally to accessories for motor vehicles. More particularly, the disclosure describes a multitask work surface integrated into a vehicle trunk lid structure.

BACKGROUND

The modern motor vehicle such as the sedan, sports car, etc. includes a variety of storage areas. The primary and largest storage space provided in such vehicles is typically the trunk, most conventionally disposed at a rear of the vehicle. Often, the motor vehicle user desires a usable work surface on which to rest items or to perform tasks. As a non-limiting example, the user may be carrying food and other items for an outing, and requires a work surface on which to place them. Other than potentially the trunk floor with its attendant disadvantages in accessibility and ergonomics, no such work surface is provided in the motor vehicle, and the user is required to find such a work surface or to carry a table or other such work surface in the vehicle, occupying already limited storage space.

To solve this and other problems, the present disclosure describes an integrated, hidden work surface for a motor vehicle. Advantageously, when not in use the work surface is stored in a stowed associated with a trunk lid of the motor vehicle. For use, the work surface is translated from the vehicle trunk lid to a deployed configuration above or within the vehicle trunk storage area. Thus, while stored the work surface does not occupy any existing cargo space of the vehicle, for example the vehicle trunk. When deployed, the work surface may be used as a table or other work surface, further enhancing user convenience and versatility of the described device.

Accordingly, to solve the foregoing and other problems, the present disclosure relates to a multitask work surface such as for a motor vehicle trunk lid. Advantageously, the described work surface is integrated into and deploys from the vehicle trunk lid, and so does not occupy usable vehicle storage space when not in use. Advantageously, the multitask work surface uses already available cargo area closure panel support arms for deployment.

SUMMARY

In accordance with the purposes and benefits described herein, in one aspect of the present disclosure an integrated work surface for a motor vehicle is provided, comprising an integrated work surface assembly for a motor vehicle cargo area. The assembly includes a substantially planar workpiece configured for translation along a pair of cargo area closure panel support arms between a fully stowed configuration and a fully deployed configuration. In embodiments, a recess is provided in the cargo area closure panel, configured for receiving and holding the substantially planar workpiece in the fully stowed configuration. The cargo area closure panel may be one of a trunk lid, a decklid, and a hatchback rear door, a lift gate, a fifth door, and others.

Each of the pair of cargo area closure panel support arms includes a guide slot for slidingly translating the substantially planar workpiece between the fully stowed configuration and the fully deployed configuration. A pair of cooperating workpiece-mounted bearings are provided for engaging the cargo area closure panel support arm guide slots to allow slidingly translating the workpiece along the support arms. The bearings also allow the workpiece to pivot to the fully deployed configuration. In embodiments, the support arms may further include a retainer to prevent inadvertent closing of the cargo area closure panel caused by the weight of the workpiece.

In embodiments, each of the pair of cargo area closure panel support arm guide slots includes a first stop for arresting a downward translation of the substantially planar workpiece. In embodiments, at least one of the pair of cargo area closure panel support arms is associated with a second stop configured for arresting a downward pivoting motion of the substantially planar workpiece.

In the following description, there are shown and described embodiments of the disclosed integrated work surface. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed integrated work surface for a motor vehicle, and together with the description serve to explain certain principles thereof. In the drawing.

Reference will now be made in detail to embodiments of the disclosed integrated work surface for a motor vehicle, examples of which are illustrated in the accompanying drawing figures.

DETAILED DESCRIPTION

Figure 1:
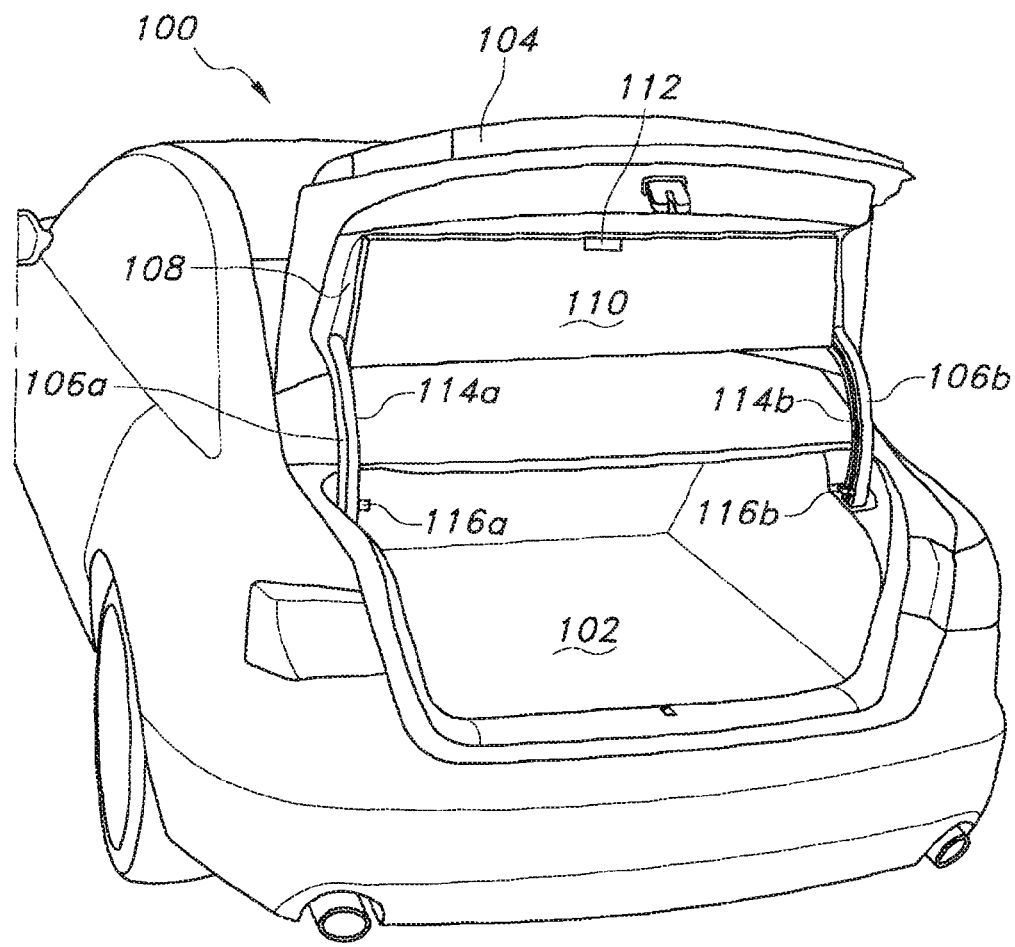
FIG. 1 shows a vehicle including a trunklid-mounted integrated work surface according to the present disclosure.

With reference to FIG. 1 there is shown a motor vehicle 100, in the depicted embodiment being a sedan-type vehicle including a cargo area 102 defined by the trunk. A cargo area closure panel 104 is provided, hingedly connected by a pair of support arms 106*a*, 106*b*.

The closure panel 104 includes a recess 108 dimensioned and configured to hold a substantially planar workpiece 110 in the fully stowed configuration shown in the drawing figure. A handle or pull strap 112 allows displacement of the workpiece 110 from the fully stowed configuration. Each of the support arms 106*a*, 106*b* includes a guide slot 114*a*, 114*b*. Each of the guide slots 114*a*, 114*b* includes or is associated with at least one stop, the purpose of which will be discussed in detail below.

Figure 2:
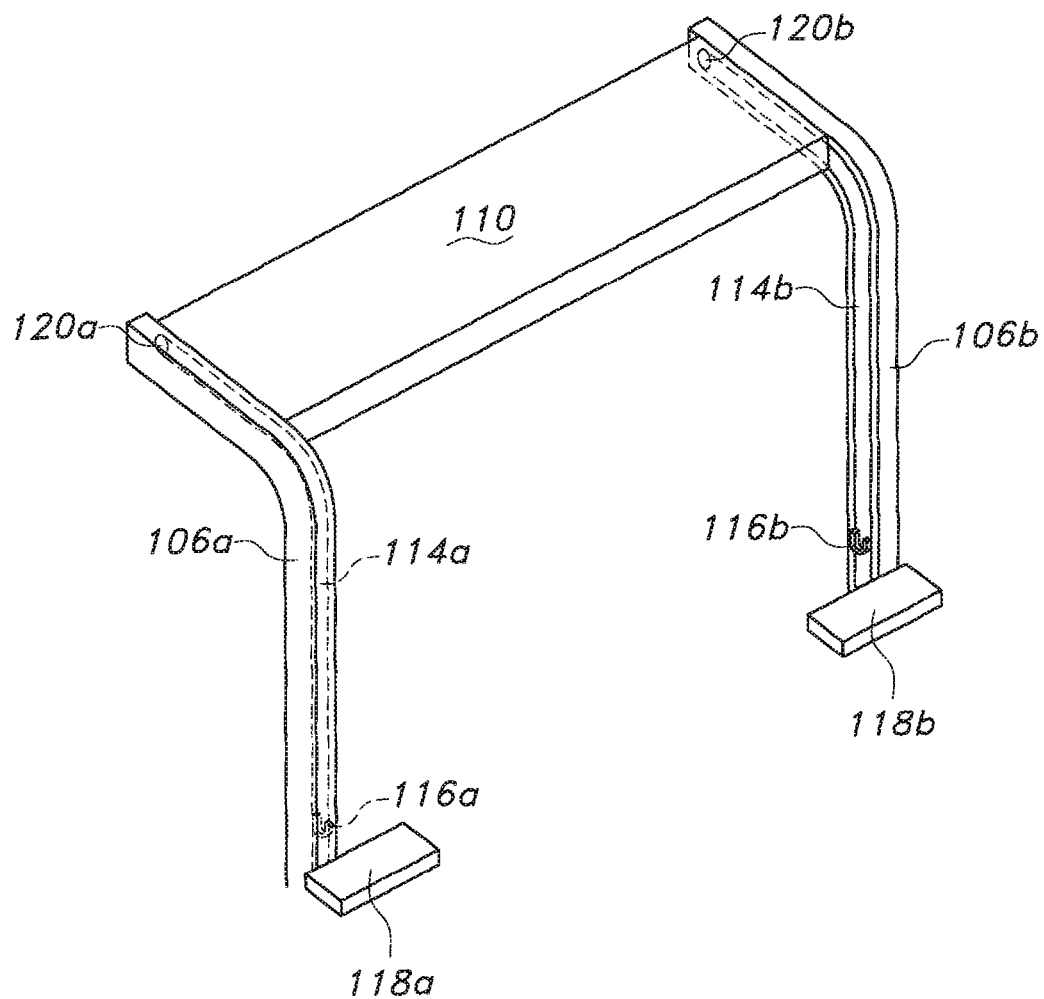
FIG. 2 shows pair of support arms for translating the work surface of FIG. 1.

FIG. 2 shows in isolation an embodiment of support arms 106*a*, 106*b* for translating the workpiece 110 between a fully stowed and a fully deployed configuration. As shown therein, first stops 116*a* and 116*b* (not visible in this view)

are disposed at an end of the support arms 106a, 106b wherein the workpiece 110 is to be held in the fully deployed configuration. That is, first stops 116a, 116b are at the end of the support arms 106a, 106b farthest from the closure panel 104 (not shown in this view). In the depicted embodiment, first stops 116a, 116b are substantially arcuate in configuration, allowing a pivoting motion of the workpiece 110 as will be described in detail below. The support arms 116a, 116b may also be associated with at least one second stop, the purpose of which is to stop a downward pivoting motion of the workpiece 110 at a fully deployed configuration. In the depicted embodiment, a pair of second stops 118a and 118b are provided.

The workpiece 110 also includes end-mounted bearings 120a, 120b configured and dimensioned for slidingly translating within the support arm guide slots 114a, 114b. The bearings 120a, 120b are also configured and dimensioned to be received in first stops 116a and 116b, and to allow pivoting the workpiece between a substantially vertical and a substantially horizontal configuration. The second stops 118a, 118b are positioned to stop the forward pivoting movement of the workpiece 110, and to hold the workpiece in the substantially horizontal, fully deployed configuration.

Figure 3A:
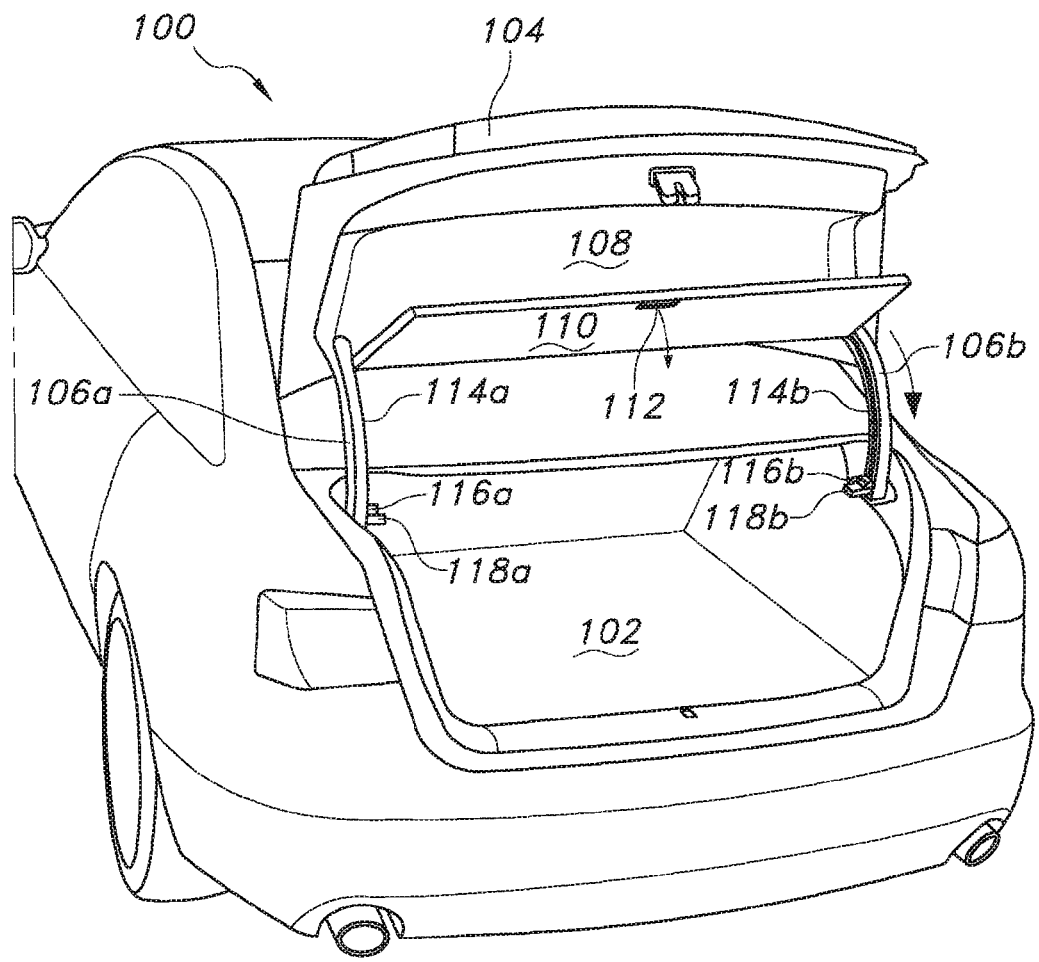
FIG. 3A shows the work surface of FIG. 1 in a partially deployed configuration.

With reference to FIG. 3A, in use a vehicle user grasps the workpiece handle 112 to release the workpiece 110 from its fully stowed position in recess 108, and begins translating the workpiece downwardly along support arms 106a, 106b. On reaching first stops 116a, 116b, downward translation of the workpiece 110 is arrested. Next, the workpiece 110 may be pivoted downwardly to the fully deployed configuration shown in FIG. 3B, the workpiece 110 resting on second stops 118a, 118b. At need, the workpiece 110 may simply be returned to the fully stowed configuration by performing the above steps in reverse order.

Figure 3B:
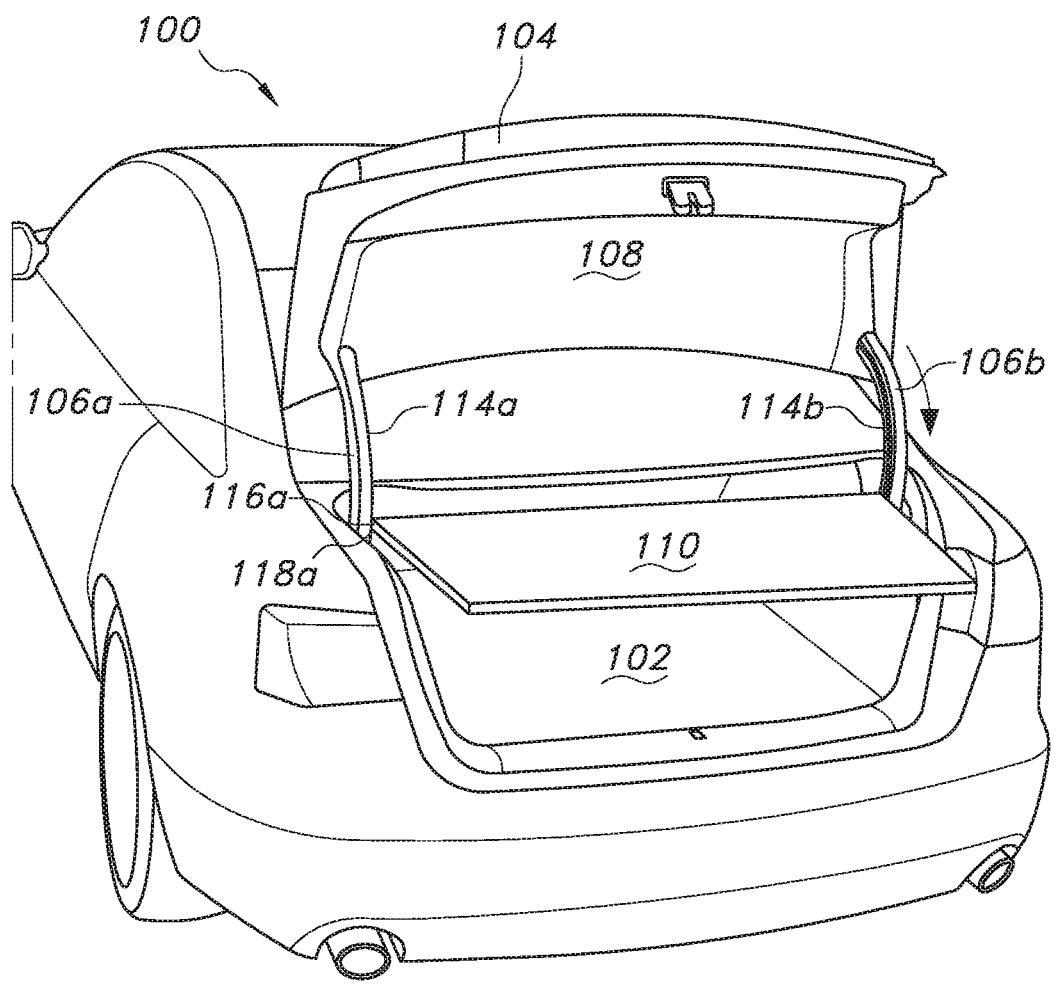
FIG. 3B shows the work surface of FIG. 1 in a fully deployed configuration.
Figure 4:
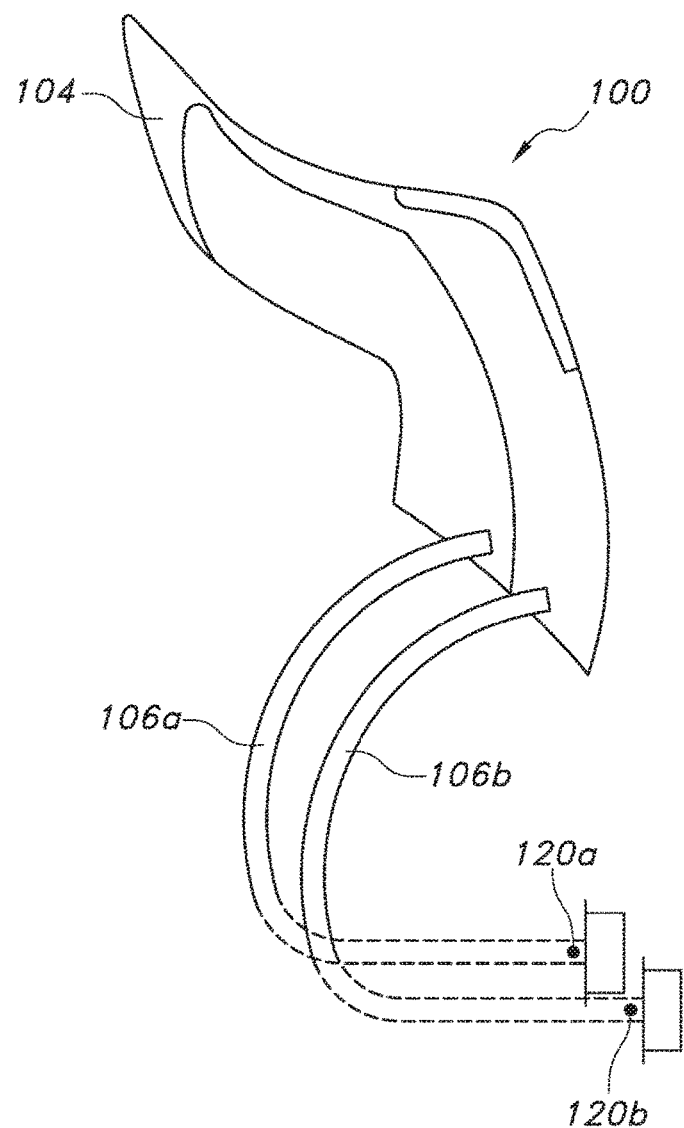
FIG. 4 shows a retainer for maintaining the support arms and an associated cargo area closure panel of FIG. 2 in an open configuration.

As shown in FIG. 3B, the fully deployed configuration of workpiece 110 holds the workpiece at a spaced distance above cargo area 102, conveniently allowing access to at least a portion of the cargo area for use. Of course, the workpiece 110 may be held in a fully deployed configuration either closer to closure panel 104, further within cargo area 102, or indeed resting upon a floor of cargo area 102 as desired, simply be altering the placement of at least first stops 116a, 116b.

As will be appreciated, the workpiece 110 and any items placed thereon could potentially have sufficient weight to cause inadvertent closing of the cargo area closure panel 104. Therefore, desirably a retainer for maintaining the support arms 106a, 106b and associated cargo area closure panel 104 in the open configuration shown in FIG. 1 may be provided. In one embodiment, the retainer comprises a pair of dogs or pins 120a, 120b which insert into cooperating apertures (not shown) in support arms 106a, 106b to physically impede pivoting of the support arms. Of course, other retainer systems are suitable for this purpose and are contemplated for use herein, including without intending any limitation ratchet surfaces on support arms 106a, 106b and cooperating pawls, friction or interference mechanisms which prevent undesired movement of the support arms, and others.

Obvious modifications and variations are possible in light of the above teachings. For example, the disclosed motor vehicle integrated work surface is described herein primarily in an embodiment associated with a motor vehicle trunk lid. However, it will be appreciated that the integrated work surface is readily integrated into any motor vehicle closure panel, such as a decklid, a hatchback lid, and others. In turn, in addition to or in place of a cargo area closure panel recess for receiving the described workpiece, one or more retainers such as clips, friction fittings, or the like may be provided for holding the workpiece in the described fully stowed configuration.

Therefore, the disclosure should not be taken as limiting in this respect. All such modifications and variations are within the scope of the appended claims when interpreted in accordance with the breadth to which they are fairly, legally and equitably entitled.

What is claimed:

1. An integrated work surface assembly for a motor vehicle cargo area, comprising a substantially planar workpiece configured for translation along a pair of cargo area closure panel support arms between a fully stowed configuration and a fully deployed configuration.

2. The assembly of claim 1, including a recess provided in the cargo area closure panel, configured for receiving and holding the substantially planar workpiece in the fully stowed configuration.

3. The assembly of claim 1, wherein each of the pair of cargo area closure panel support arms includes a guide slot for slidingly translating the substantially planar workpiece between the fully stowed configuration and the fully deployed configuration.

4. The assembly of claim 3, wherein the substantially planar workpiece includes a pair of cooperating bearings for engaging the cargo area closure panel support arm guide slots.

5. The assembly of claim 4, wherein the substantially planar workpiece is configured to pivot to the fully deployed configuration by way of the pair of cooperating bearings.

6. The assembly of claim 1, wherein each of the pair of cargo area closure panel support arm guide slots includes a first stop for arresting a downward translation of the substantially planar workpiece.

7. The assembly of claim 5, further including a second stop associated with each of the pair of cargo area closure panel support arms for arresting a downward pivoting motion of the substantially planar workpiece.

8. The assembly of claim 1, wherein the cargo area closure panel is one of a trunk lid, a decklid, a hatchback rear door, a lift gate, and a fifth door.

9. A motor vehicle including the assembly of claim 1.

10. An integrated work surface assembly for a motor vehicle cargo area, comprising:
   a substantially planar workpiece configured for translation along a pair of cargo area closure panel support arms between a fully stowed configuration and a fully deployed configuration; and
   a cargo area closure panel comprising a recess for receiving the substantially planar workpiece therein in the fully stowed configuration.

11. The assembly of claim 10, wherein each of the pair of cargo area closure panel support arms includes a guide slot for slidingly translating the substantially planar workpiece between the fully stowed configuration and the fully deployed configuration.

12. The assembly of claim 11, wherein the substantially planar workpiece includes a pair of cooperating bearings for engaging the cargo area closure panel support arm guide slots.

13. The assembly of claim 12, wherein the substantially planar workpiece is configured to pivot to the fully deployed configuration by way of the pair of cooperating bearings.

14. The assembly of claim 10, wherein each of the pair of cargo area closure panel support arm guide slots includes a first stop for arresting a downward translation of the substantially planar workpiece.

15. The assembly of claim 14, further including a second stop associated with each of the pair of cargo area closure panel support arms for arresting a downward pivoting motion of the substantially planar workpiece.

16. The assembly of claim 10, wherein the cargo area closure panel is one of a trunk lid, a decklid, a hatchback rear door, a lift gate, and a fifth door.

17. A motor vehicle including the assembly of claim 10.

18. A motor vehicle, comprising:
   a body defining a cargo area;
   a cargo area closure panel;
   a pair of cargo area closure panel support arms each including a guide slot; and
   a substantially planar workpiece configured for translation along the guide slots between a fully stowed configuration and a fully deployed configuration;
   the cargo area closure panel comprising a recess for receiving the substantially planar workpiece therein in the fully stowed configuration.

19. The motor vehicle of claim 18, wherein the substantially planar workpiece includes a pair of cooperating bearings for engaging the cargo area closure panel support arm guide slots.

20. The motor vehicle of claim 18, wherein each of the pair of cargo area closure panel support arm guide slots includes at least one stop for arresting a downward translation of the substantially planar workpiece.

* * * * *